United States Patent
Brickey

[11] 3,988,732
[45] Oct. 26, 1976

[54] 3-CHANNEL SELECTABLE POLARIZATION, TARGET DISCRIMINATION ANTENNA

[75] Inventor: Orville G. Brickey, Indianapolis, Ind.

[73] Assignee: The United States of America as represented by the Secretary of the Navy, Washington, D.C.

[22] Filed: Dec. 22, 1965

[21] Appl. No.: 515,740

[52] U.S. Cl. .......................... 343/100 PE; 333/11; 333/21 A; 343/16 M; 343/756
[51] Int. Cl.² ...................................... H01Q 15/24
[58] Field of Search............ 343/16 SD, 100.3, 756, 343/16 M, 100 PE; 333/11, 21, 21 A

[56] References Cited
UNITED STATES PATENTS

| | | | |
|---|---|---|---|
| 2,965,898 | 12/1960 | Lewis | 343/100 |
| 3,109,996 | 11/1963 | Allen | 333/6 |

*Primary Examiner*—Richard A. Farley
*Assistant Examiner*—Richard E. Berger
*Attorney, Agent, or Firm*—R. S. Sciascia; Paul S. Collignon

[57] ABSTRACT

A monopulse radar antenna having an improved three-channel feedhorn for providing selectable polarization and greater target discrimination. The antenna feed employs a comparator having a difference port, a first sum port, and a second sum port utilizing a coupling pin or probe therein, between the comparator ports and an adjustable polarization device, for receiving and separating returned energy which has become cross-polarized with respect to the polarization of the transmitting sum arm, by reflection from an asymmetrical target. The three-channel feedhorn makes possible the identification of different types of targets, and the detection of hidden targets in rough terrain, forests, underbrush, and rough seas.

7 Claims, 3 Drawing Figures

INVENTOR.
ORVILLE G. BRICKEY
BY
H. B. Losche

3-CHANNEL SELECTABLE POLARIZATION, TARGET DISCRIMINATION ANTENNA

The invention described herein may be manufactured and used by or for the Government of the United States of America for governmental purposes without the payment of any royalties thereon or therefor.

This invention relates to radar systems and particularly to an antenna feed device which permits: two-axis tracking with the use of the sum and only one difference intermediate frequency (IF) channel; target discrimination, which necessitates two sum channels; and precipitation clutter rejection.

This antenna feed contributes an improvement over the feed horn of the invention filed in the U.S. Patent Office by Begeman et al on July 14, 1964, under the Ser. No. 384,029 on A SWITCHABLE LINEAR-CIRCULAR POLARIZED MONOPULSE RADAR FEED PRODUCING TWO-AXIS (THREE DIMENSIONAL TRACKING) INFORMATION UTILIZING A TWO-LOBE MONOPULSE DESIGN, now U.S. Pat. No. 3,453,617. That application discloses a similar invention but it does not include the target discrimination capability of this invention. The two inventions are similar in that they both utilize comparators having sum and difference ports with a polarization means, coupled to the comparator, which may be rotated to give linear, circular or elliptical polarization. This structure permits both inventions: to reject precipitation clutter when the antenna feed is circularly polarized, since return energy from precipitation is polarized circularly in the opposite direction from the transmitted energy, due to the spherical and symmetrical shape of the target, and will not be accepted by the antenna; to vary the polarization from linear through elliptical to circular to find the maximum return from the target; and, when the feed is circularly polarized, to track a target simultaneously in two axes, as with a four-lobe monopulse system, while using one receiver difference channel instead of two difference channels.

The instant invention adds to this structure a coupling pin or probe, between the comparator ports and the polarizer, for the purpose of receiving that energy which is cross-polarized with respect to the polarization of the transmitting sum arm. This constitutes a great stride in radar art by enhancing the ability to identify different types of targets and to detect hidden targets in rough terrain, forests, underbrush, and rough seas. The invention may also be used in a passive system as a radar detector wherein the polarization of received energy may be linear, elliptical, or either rotation of circular. When circularly polarized radio-frequency (r-f) energy bounces off an asymmetrical target, the direction of rotation of polarization is reversed and the reflected energy is returned to the antenna with an odd number of bounces, but when it bounces off a symmetrical target it retains the same direction of rotation and is returned to the antenna with an even number of bounces. Therefore, to be able to discriminate between targets, it is necessary to be able to receive both right and left hand circular polarized energy simultaneously with a separate output for each direction of rotation. This invention enables this type of reception in one compact antenna. Prior to this invention, two antennas were required for target discrimination causing size and accuracy problems. It is therefore a general object of this invention to provide a radio-frequency energy comparator which, when combined with a radar system, will permit target discrimination while also providing a means of precipitation clutter rejection and two-axis tracking.

These and other objects, features, and uses of this invention will become more apparent to those of ordinary skill in the art as the detailed description proceeds when considered along with the accompanying drawings, in which.

Figure 1:
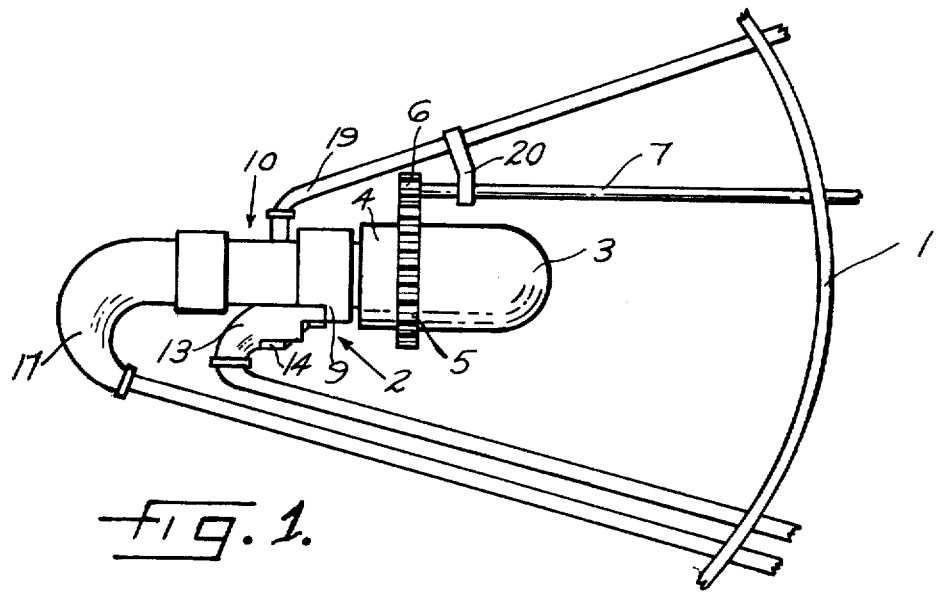
FIG. 1 is an elevational view of one embodiment of the monopulse antenna assembly of this invention.
Figure 2:
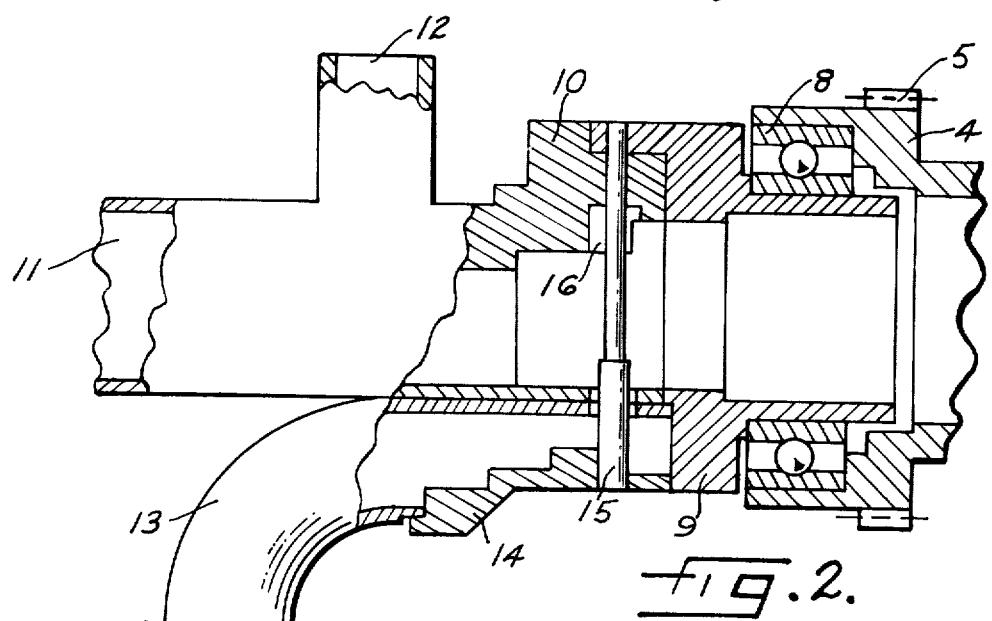
FIG. 2 is a partially sectional view of the monopulse antenna feed in FIG. 1 without the polarizer or weather cap.

In the embodiment of the invention illustrated in FIGS. 1 and 2, the device includes an antenna reflector 1 at the focal point of which is an antenna feed 2 the output of which is covered by a weather cap 3 of suitable material known to the art. The cap is threaded and attached thereby to a circular polarizer 4 which has an annlar gear 5 which engages a spur gear 6 attached to a rotatable shaft 7. The circular polarizer is pressed over a bearing 8, shown in FIG. 2, which permits the polarizer to rotate when driven by the gears. The bearing is pressed on a piece of circular waveguide, designated as the circular extension 9, which is welded to the output walls of a folded-tee comparator 10 in alignment with its output port. Therefore the circular extension 9 forms a waveguide extension to the rectangular output of the folded-tee comparator 10. The folded-tee 10 has a first sum port 11, a difference port 12, and an output port. A second sum output waveguide 13 is welded to the folded-tee 10 and to its circular extension 9. Welded to the second sum waveguide 13 is a transition piece 14 through which a pin or probe 15 passes. The pin passes through counterbore 16 and through to the outer surface of the folded-tee 10. FIG. 1 shows first sum 17, second sum 13, and difference 19 waveguides, which support the antenna feed at the reflector focal point. Spur gear 6 and drive shaft 7 are rotatably held in place by a brace 20.

Figure 3:
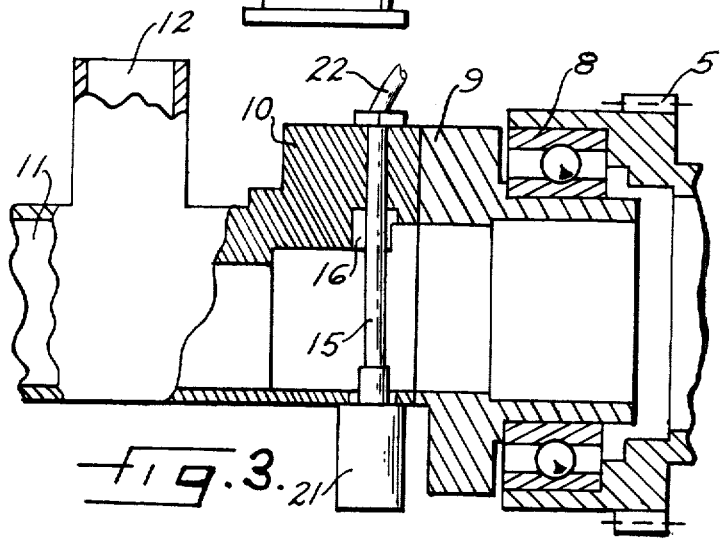
FIG. 3 shows another embodiment of the antenna feed with the second sum waveguide replaced by a crystal and coaxial cable.

Another embodiment of the invention is illustrated in FIG. 3 wherein the antenna feed is the same as that of FIG. 2 with the exception that the waveguide section 13 and the step transition piece 14 are replaced by a crystal 21 which connects to the coupling pin 15. The other end of the coupling pin is connected to a coaxial cable 22 to couple the signal to the radar receiver.

OPERATION

Looking to FIGS. 1 and 2, monopulse energy of $TE_{10}$ polarization is transmitted through waveguide 17 into the first sum port 11 which is the normal sum port of an r-f folded-tee energy comparator. The energy passes the difference port 12 and when it reaches the circular extension 9 which extends from the output of the folded-tee it converts to $TE_{11}$ polarized energy. Passing through the folded-tee output port is the coupling pin or probe 15. This pin has no effect on transmitted energy since it is perpendicular to the direction of the energy polarization at this point in the waveguide. Continuing along the path the signal next encounters the circular polarizer 4, then past the transmit-receive aperature and through the weather cap 3 to the reflector 1. By reciprocity, the return path for the signal is the same until it reaches the coupling pin which couples that energy cross-polarized with respect to the first-sum port (since the pin is parallel to this cross-polarized field) to the cavity formed by the second sum waveguide 13 and the step transition piece 14. Pin 15 can be thought of as the coupling pin or probe for a waveguide-to-coax-to-waveguide coupler, coupling energy to the second sum waveguide 13, via the step transition piece 14, which energy cannot propagate from the first sum port 11 because it is cross-polarized to this port and therefore cut off due to frequency and dimensions. The step transition piece 14 acts as an impedance transformer as explained in *Principles and Applications of Waveguide Transmission* by George Southworth, Third Printing, 1956, Section 9.1 on "Waveguide Transformers". Each step is λ/4 long and acts as a quarter-wave transformer to match the input impedance of the second sum waveguide 13 to the impedance of the waveguide-to-coax-to-waveguide transition. The purpose of the counterbore 16 is to match the impedance of the pin 15 to the impedance of the transmit-receive aperature. To attain this match it is necessary for the coupling pin 15 to be of a certain length and since the waveguide inside dimension is fixed, a hole must be counterbored to give the desired length. In the event that tolerance inaccuracies arise in the production of the transition step piece 14, the coupling pin 15 is manufactured as illustrated with a change in diameter. The production tolerances may then be compensated for by raising or lowering the pin in the circular waveguide.

The difference port propagates only that energy which traveled through the circular extension 9 in the $TM_{01}$ mode of the polarization as explained in the above noted application, Ser. No. 384,029. That application explains in detail the function, structure, and operation of the circular polarizer, the folded-tee, and a radar system which uses a similar antenna feed to track a target simultaneously in two dimensions. For this reason no further explanation of the polarizer, the folded-tee, or the tracking radar system will be given herein except to say that rotation of the polarizer 4 by means of the gears 5 and 6 permits transmission and reception of linearly, circularly, or elliptically polarized energy.

In the embodiment illustrated in FIG. 3 the second sum waveguide 13 and the transition piece 14 have been replaced by a crystal 21. Under these conditions the antenna feed could be combined with a passive radar system enabling radar detection of linearly, elliptically or circularly (either direction of rotation) polarized energy and also enabling tracking of the source of that energy. The system would have to be passive, however, since a transmit-receiver (TR) device could not be employed to protect the crystal if the crystal were connected directly to the coupling pin 15. Therefore, in this embodiment the antenna feed could be used only to receive energy and it could not be used to transmit energy.

Among the many uses of the invention, the following are a few: if switching is provided between the two sum signals then either one may be used as the reference phase for tracking information; if switching is provided between the two sum signals then either or both may be viewed on a radar indicator giving precipitation clutter rejection, and target discrimination; if provision is made for using only the sum signals, then the antenna will supply information enabling all the above described functions except tracking. The above attributes would be very useful in an aircraft or missile radar. For example, the amount of reflected energy from a target will vary with the mode of polarization of the radiating signal. Using this antenna feed, a radar operator could choose a target and vary the signal polarization for a maximum return signal; or, he could locate symmetrical targets in asymmetrical surroundings and vice versa.

It will be understood that various changes in the details, which have been herein described and illustrated in order to explain the nature of the invention, may be made by those skilled in the art within the principle and scope of the invention and I desire to be limited only in the scope of the appended claims.

I claim:
1. A monopulse radar antenna feed comprising:
   a radio frequency energy comparator having a first sum port, a difference port, and a second sum output means including a coupling probe, said comparator being supported on the radar antenna by a first sum waveguide and a difference waveguide coupled in alignment with said first sum port and said difference port, respectively; and
   a rotatable circular polarizing means coupled to said comparator providing circular polarization of the transmitted energy, the return of which is separated in said comparator so that energy reflected with an even number of bounces from a target is received through said first sum port while energy reflected with an odd number of bounces from a target, which energy is therefore cross-polarized with respect to said first sum port, will be received through said second sum coupling probe thus providing target discrimination and precipitation clutter rejection.

2. A monopulse radar antenna feed as set out in claim 1 wherein said comparator is a folded-tee with a circular waveguide extension coupled to the output walls, the difference port of which receives energy permitting two-axis tracking when said polarizer is circularly polarized.

3. A monopulse radar antenna feed as set out in claim 2 wherein
   said coupling probe is inserted across the output of said folded-tee.

4. A monopulse radar antenna feed as set out in claim 3 wherein
   said second sum output means includes a rectangular waveguide having a matching step transition piece inserted therein, said matching piece comprised of a series of quarter-wave transformers, for the purpose of matching the impedance of said rectangular waveguide of said second sum output means to the impedance of said coupling probe.

5. A monopulse radar antenna feed as set forth in claim 1 wherein
   said second sum output means including a coupling probe is comprised of a crystal detector coupled to one end of said coupling probe and the other end of said coupling probe is adapted to be coupled to a coaxial cable whereby received energy, which is cross-polarized with respect to said first sum port, is conducted through said second sum output means thus providing for detection of a radar energy source which is transmitting selectively linearly, elliptically, and either rotation of circularly polarized energy.

6. A radar antenna receiving feed as set out in claim 5 wherein
   said comparator is a folded-tee with a circular waveguide extension coupled to the output walls, the difference port of which receives energy permitting two-axis tracking when said polarizer is circularly polarized.

7. A radar antenna receiving feed as set out in claim 6 wherein
   said coupling probe is inserted across the output port of said folded-tee.

* * * * *